United States Patent [19]
Ito

[11] Patent Number: 6,014,282
[45] Date of Patent: Jan. 11, 2000

[54] MAGNETIC DISK APPARATUS AND METHOD OF DETECTING HEAD FAULT

[75] Inventor: Hiroshi Ito, Iruma, Japan

[73] Assignee: Kabushiki Kaisha Toshiba, Kawasaki, Japan

[21] Appl. No.: 08/925,062

[22] Filed: Sep. 8, 1997

[30] Foreign Application Priority Data

Feb. 27, 1997 [JP] Japan .................................. 9-043826

[51] Int. Cl.⁷ .................................................. G11B 21/02
[52] U.S. Cl. .......................... 360/75; 360/77.01; 360/31; 360/113; 324/210
[58] Field of Search .................................. 360/31, 45, 75, 360/77.08, 77.01, 113, 53; 324/252, 207.21, 210, 225

[56] References Cited

U.S. PATENT DOCUMENTS

| | | | |
|---|---|---|---|
| 4,285,015 | 8/1981 | Rose et al. | 360/106 X |
| 4,872,071 | 10/1989 | Easton et al. | 360/31 |
| 5,130,866 | 7/1992 | Klaasen et al. | 360/75 |
| 5,247,254 | 9/1993 | Huber et al. | 360/53 X |
| 5,434,717 | 7/1995 | Yoshinaga et al. | 360/46 |
| 5,822,144 | 10/1998 | Takahashi | 360/77.08 X |

FOREIGN PATENT DOCUMENTS

7-226041  8/1995  Japan .
8-195044  7/1996  Japan .

*Primary Examiner*—Andrew L. Sniezek
*Assistant Examiner*—K. Wong
*Attorney, Agent, or Firm*—Pillsbury Madison & Sutro

[57] ABSTRACT

According to the present invention, there is provided a magnetic disk apparatus comprising a reading/writing circuit for detecting first to fourth burst signals corresponding to first to fourth burst data items recorded on a recording medium in order to position a head, a CPU for calculating a first value expressed by ((first burst signal)−(second burst signal))/((first burst signal)+(second burst signal)) and a second value expressed by ((third burst signal)−(fourth burst signal))/((third burst signal)+(fourth burst signal)) from the amplitudes of the first to fourth burst signals detected by the reading/writing circuit to move the head to a position at which the obtained first value and the obtained second value coincide with each other, a ROM for storing a reference value with which abnormality of the head is determined and a CPU for determining whether or not the difference between the absolute value of the first value when the head has been moved to the position at which the first value and the second value coincide with each other and the reference value stored in the ROM is larger than a predetermined value to detect abnormality of the head in a case where a determination has been performed that the difference between the absolute value of the first value and the reference value is larger than the predetermined value.

20 Claims, 8 Drawing Sheets

MAGNETIC DISK APPARATUS AND METHOD OF DETECTING HEAD FAULT

BACKGROUND OF THE INVENTION

The present invention relates to a magnetic disk apparatus capable of detecting a fault of a head thereof, and more particularly to a magnetic disk apparatus capable of early detecting a fault of a head of a type in which the width of the head is reduced.

The present invention relates to a method of detecting a fault of a head of a magnetic disk apparatus, and more particularly to a method of early detecting a fault of a head of a type in which the width of the head is reduced.

Magnetic disk apparatuses developed recently have been changed from thin film heads to MR (Magnetoregistive) heads in order to raise the recording density. However, the MR head is no resistant to static electricity as compared with the conventional inductive head, such as the thin film head. Thus, the MR head suffers from a problem in that the MR head can easily be electrostatically broken.

When the MR head is electrostatically broken, only a portion of the MR film is usually broken in place of complete breakage. If a portion of the MR film is broken, the output from the head is lowered and thus an error is committed. If the error rate is not lowered excessively, no practical problem sometimes arises. If a partial breakage of the MR film is enlarged, any signal cannot however be reproduced by the head.

The above-mentioned conventional technique has no method for detecting partial breakage (for example, electrostatic breakage) of the MR film for use in the MR head occurring during operation of the magnetic disk apparatus. Therefore, there is a risk that a user continues to use the apparatus without knowing the breakage of the MR film until critical breakage inhibits reproduction of a signal (reading of recorded data).

If the MR film becomes defective in a case where the MR head is used as a reading head, the characteristic of the reproduction output deteriorates. It leads to a fact that the accuracy of positioning the head deteriorates when the control of position of the head is performed.

When data is reproduced, deterioration in the positioning accuracy causes data to be reproduced from a data track in a state where the reading head is at an offtrack position (a position deviated from a designed position). Therefore, the reproduction output degrades from the rated level.

Since the reading head is positioned adjacent to a track near a required data track in this case, the influence of the recording magnetic field of the adjacent track results in noise to be intensified and increased owing to the crosstalk.

As a result, the S/N ratio which is the relationship between the reproduction output and noise degrades, thus causing the reading error rate to deteriorate. If the position accuracy deteriorates when data is recorded, data is written on the data track in a state where the writing head is at an offtrack position.

Since the writing head is positioned near the adjacent track, the writing head overwrites a portion of the adjacent track. Thus, the width of the adjacent track is undesirably reduced. When the reading head reads data from the adjacent track having a small width, the reproduction output is therefore lowered and the crosstalk is intensified. As a result, read errors are committed excessively.

In general, it is difficult to make the sensitivity distribution of the magnetoresistance effect of an MR film of an MR head to be uniform and to obtain an ideal offtrack profile (OP). The foregoing problem arises in a case where the MR film has not been formed into single magnetic domains when the MR head has been manufactured; or the single domain state of the MR film is disordered owning to an electrostatic discharge (ESD) or excess current load (EOS). Thus, so-called Barkhausen noise (BHN) is generated.

Another case is considered in which a portion of the MR film becomes defective after the MR film has been used for a long time near its lifetime.

Handling of BHN among the above-mentioned factors greatly affects the actual performance of the hard disk drive. A fact has been confirmed that BHN appears/disappears when the MR film is stimulated with a magnetic field or temperature.

That is, if the MR head, which is the reading head, has BHN during the operation of the hard disk drive, BHN sometimes disappears owning to an influence of a magnetic field generated by a writing current for the writing head or a sensing current of the MR head. Inversely, the influence of the magnetic field or the atmospheric temperature sometimes causes BHN, which has been allowed to disappear, to again appear.

When the MR head is, as the reading head, employed in the conventional magnetic disk apparatus, occurrence of an abnormal state causing the linearity of the offtrack profile (OP) of the MR film to deteriorate results in accuracy of controlling the position of the head being allowed to deteriorate. In this case, the reading error rate deteriorates, and the performance degrades in the worst comes to the worst such that data recorded on the disk will be erased.

BRIEF SUMMARY OF THE INVENTION

In view of the foregoing, an object of the present invention is to provide a magnetic disk apparatus capable of early detecting a fault of a head thereof before the head is critically broken.

Another object of the present invention is to provide a method of detecting a fault of a head capable of early detecting a fault of the head before the head is critically broken.

Another object of the present invention is to provide a magnetic disk apparatus capable of erasing BHN in a case where a fault of a MR film is caused from appearance of the BHN.

Another object of the present invention is to provide a method of detecting a fault of a head capable of erasing BHN in a case where a fault of a MR film is caused from appearance of the BHN.

To achieve the above-mentioned objects, according to first aspect of the present invention, there is provided a magnetic disk apparatus comprising:

detection means for detecting first to fourth burst signals corresponding to first to fourth burst data items recorded on a recording medium in order to position a head;

calculating means for calculating a first value expressed by ((the first burst signal)−(the second burst signal))/((the first burst signal)+(the second burst signal)) and a second value expressed by ((the third burst signal)−(the fourth burst signal))/((the third burst signal)+(the fourth burst signal)) from amplitudes of the first to fourth burst signals detected by the detection means;

control means for moving the head to a position at which the first value and the second value obtained by the calculating means coincide with each other;

storage means for storing a reference value with which abnormality of the head is determined;

first determination means for determining whether or not difference between an absolute value of the first value and the reference value stored in the storage means when the head has been moved to the position at which the first value and the second value coincide with each other by the control means is larger than a predetermined value; and abnormality detection means for detecting abnormality of the head in a case where the first determination means has determined that a difference value between the absolute value of the first value and the reference value is larger than the predetermined value.

According to a second aspect of the present invention, there is provided the magnetic disk apparatus according to the first aspect, wherein the control means performs head moving process and the abnormality detection means performs abnormality detection process during an initialization process which is performed after electric power has been supplied to the magnetic disk apparatus.

According to a third aspect of the present invention, there is provided the magnetic disk apparatus according to the first aspect, wherein the reference value is stored in the storage means when the magnetic disk apparatus is manufactured.

According to a fourth aspect of the present invention, there is provided the magnetic disk apparatus according to the first aspect, wherein the storage means is an EEPROM.

According to a fifth aspect of the present invention, there is provided the magnetic disk apparatus according to the first aspect, wherein the reference value is the first value when the head has been moved by the control means to a position at which the first value and the second value coincide with each other when the magnetic disk apparatus has been manufactured.

According to a sixth aspect of the present invention, there is provided the magnetic disk apparatus according to the first aspect, wherein the abnormality detection means comprises:
dummy writing means for performing a dummy writing operation in a case where the first determination means has determined that the absolute value of the first value is larger than the reference value;
second determination means for determining whether or not the dummy writing means has performed the dummy writing operations by a predetermined number of times; and
means for detecting abnormality of the head in a case where the second determination means has determined that the dummy writing operations have been performed by the predetermined number of times.

According to a seventh aspect of the present invention, there is provided a magnetic disk apparatus structured to detect burst signals i and j corresponding to burst data i and j from a recording medium on which at least three burst data pairs each having burst data i and j have been recorded, to position a head thereof in accordance with detected burst signals i and j, the magnetic disk apparatus comprising:

calculating means for obtaining a result of a calculation expressed by $(i-j)/(i+j)$ for each pair from amplitudes of the burst signals i and j in two arbitrary pairs among the detected burst signals i and j;

control means for moving the head to a position at which results of calculations of the two arbitrary pairs obtained by the calculating means coincide with each other;

storage means for storing a reference value for determining abnormality of the head;

first determination means for determining whether or not difference between an absolute value of the result of the calculation when the head has been moved to the position at which the results of calculations of the two arbitrary pairs coincide with each other by the control means and the reference value stored in the storage means is larger than a predetermined value; and abnormality detection means for detecting abnormality of the head in a case where the first determination means has determined that the difference between the absolute value of the result of the calculation and the reference value is larger than the predetermined value.

According to an eighth aspect of the present invention, there is provided the magnetic disk apparatus according to the seventh aspect, wherein the head moving process which is performed by the control means and the abnormality detection process which is performed by the abnormality detection means are performed during an initialization process which is performed after electric power has been supplied to the magnetic disk apparatus.

According to a ninth aspect of the present invention, there is provided the magnetic disk apparatus according to the seventh aspect, wherein the reference value is stored in the storage means when the magnetic disk apparatus is manufactured.

According to a tenth aspect of the present invention, there is provided the magnetic disk apparatus according to the seventh aspect, wherein the storage means is an EEPROM.

According to an eleventh aspect of the present invention, there is provided the magnetic disk apparatus according to the seventh aspect, wherein the reference value is a result of a calculation when the head has been, by the control means, moved to the position at which the results of calculations of the two arbitrary pairs coincide with each other when the magnetic disk apparatus has been manufactured.

According to a twelfth aspect of the present invention, there is provided the magnetic disk apparatus according to the seventh aspect, wherein the abnormality detection means comprises:
dummy writing means for performing a dummy writing operation in a case where the first determination means has determined that the absolute value of the first value is larger than the reference value;
second determination means for determining whether or not the dummy writing means has performed the dummy writing operations by a predetermined number of times; and
means for detecting abnormality of the head in a case where the second determination means has determined that the dummy writing operations have been performed by the predetermined number of times.

According to a thirteenth aspect of the present invention, there is provided a method of detecting a fault of a head, comprising the steps of:

detecting first to fourth burst signals corresponding to first to fourth burst data items recorded on a recording medium in order to position a head;

calculating a first value expressed by
((the first burst signal)−(the second burst signal))/((the first burst signal)+(the second burst signal))

and a second value expressed by
((the third burst signal)−(the fourth burst signal))/((the third burst signal)+(the fourth burst signal)) from amplitudes of detected first to fourth burst signals;

moving the head to a position at which the first value and the second value coincide with each other;

determining whether or not the difference between an absolute value of the first value and the reference value when the head has been moved to the position at which the first value and the second value coincide with each other is larger than a predetermined value; and detecting abnormality of the head in a case where a determination has been performed that the difference between the absolute value of the first value and the reference value is larger than the predetermined value.

According to a fourteenth aspect of the present invention, there is provided the method of detecting a fault of a head according to the thirteenth aspect, wherein the head moving process and the abnormality detection process are performed during an initialization process which is performed after electric power has been supplied to the magnetic disk apparatus.

According to a fifteenth aspect of the present invention, there is provided the method of detecting a fault of a head according to the thirteenth aspect, wherein the reference value is the first value when the head has been moved to the position at which the first value and the second value coincide with each other when the magnetic disk apparatus has been manufactured.

According to a sixteenth aspect of the present invention, there is provided the method of detecting a fault of a head according to thirteenth aspect,
wherein the step of detecting abnormality comprising the steps of:
performing a dummy writing operation in a case where a determination has been performed that the absolute value of the first value is larger than the reference value;

determining whether or not the dummy writing operations have been performed by a predetermined number of times; and detecting abnormality of the head in a case where a determination has been performed that the dummy writing operations have been performed by the predetermined number of times.

According to a seventeenth aspect of the present invention, there is provided a method of detecting a fault of a head comprising the steps of:

detecting burst signals i and j corresponding to burst data i and j from a recording medium on which at least three burst data pairs each consisting of burst data i and j have been recorded;

obtaining a result of a calculation expressed by (i−j)/(i+j) for each pair from the amplitudes of the burst signals i and j in two arbitrary pairs among the detected burst signals i and j;

moving the head to a position at which results of calculations of the two arbitrary pairs coincide with each other;

determining whether or not the difference between the absolute value of a result of a calculation when the head has been moved to the position at which the results of calculations of the two arbitrary pairs coincide with each other and a reference value is larger than a predetermined value; and detecting abnormality of the head in a case where a determination has been performed that the difference between the absolute value of the result of the calculation and the reference value is larger than the predetermined value.

According to an eighteenth aspect of the present invention, there is provided the method of detecting a fault of a head according to seventeenth aspect,
wherein the head moving process and the abnormality detection process are performed during an initialization process which is performed after electric power has been supplied to the magnetic disk apparatus.

According to a nineteenth aspect of the present invention, there is provided the method of detecting a fault of a head according to the seventeenth aspect,
wherein the reference value is the result of the calculation when the head has been moved to the position at which the results of calculations of the two arbitrary pairs coincide with each other when the magnetic disk apparatus has been manufactured.

According to a twentieth aspect of the present invention, there is provided the method of detecting a fault of a head according to the seventeenth aspect,
wherein the step of detecting abnormality of the head comprising the steps of:
performing a dummy writing operation in a case where a determination has been performed that the absolute value of the first value is larger than the reference value;

determining whether or not the dummy writing operations have been performed by a predetermined number of times; and detecting abnormality of the head in a case where a determination has been performed that the dummy writing operations have been performed by the predetermined number of times.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the drawings.

Figure 1:
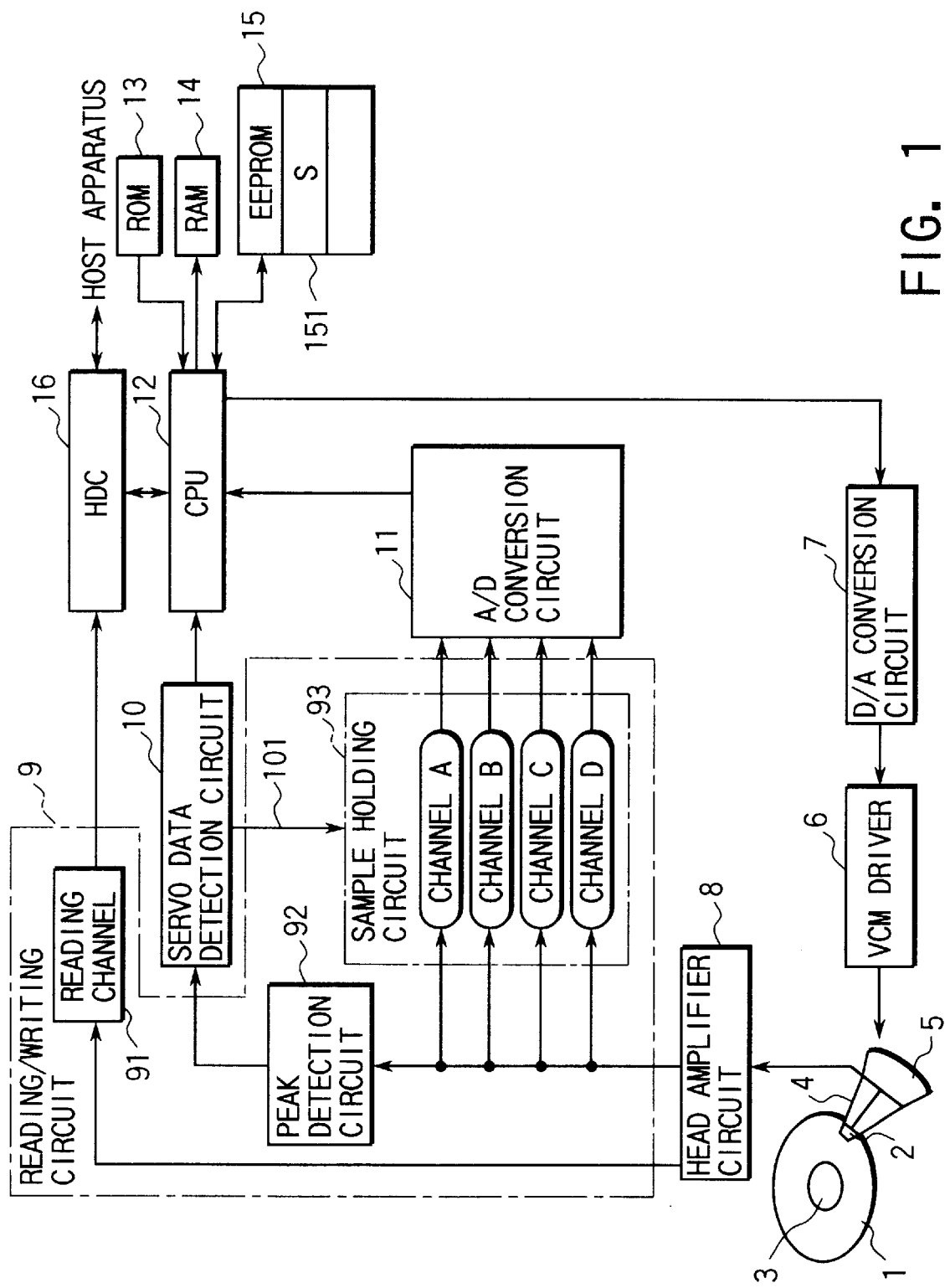
FIG. 1 is a block diagram showing a head positioning system of a magnetic disk apparatus according to an embodiment of the present invention.

FIG. 1 is a block diagram showing a head positioning system of a magnetic disk apparatus according to the embodiment of the present invention.

Referring to FIG. 1, reference numeral 1 represents a disk (a magnetic disk medium) and 2 represents a head (a magnetic head) for use to write (record) data on the disk 1 and to read (reproduce) data from the disk 1.

The heads 2 are provided to correspond to the data surfaces of the disk 1. The head 2 is a head (a composite head) in which reproduction and recording are separated from each other and which has an MR head serving as a reading head and a recording head.

Although the disk 1 according to this embodiment is in the form of a single disk, a structure is sometimes employed in which a plurality of disks are stacked to form the disk 1. Moreover, the head 2 is not limited to the MR head. The head 2 may be a thin film head or a GMR head.

Figure 2:
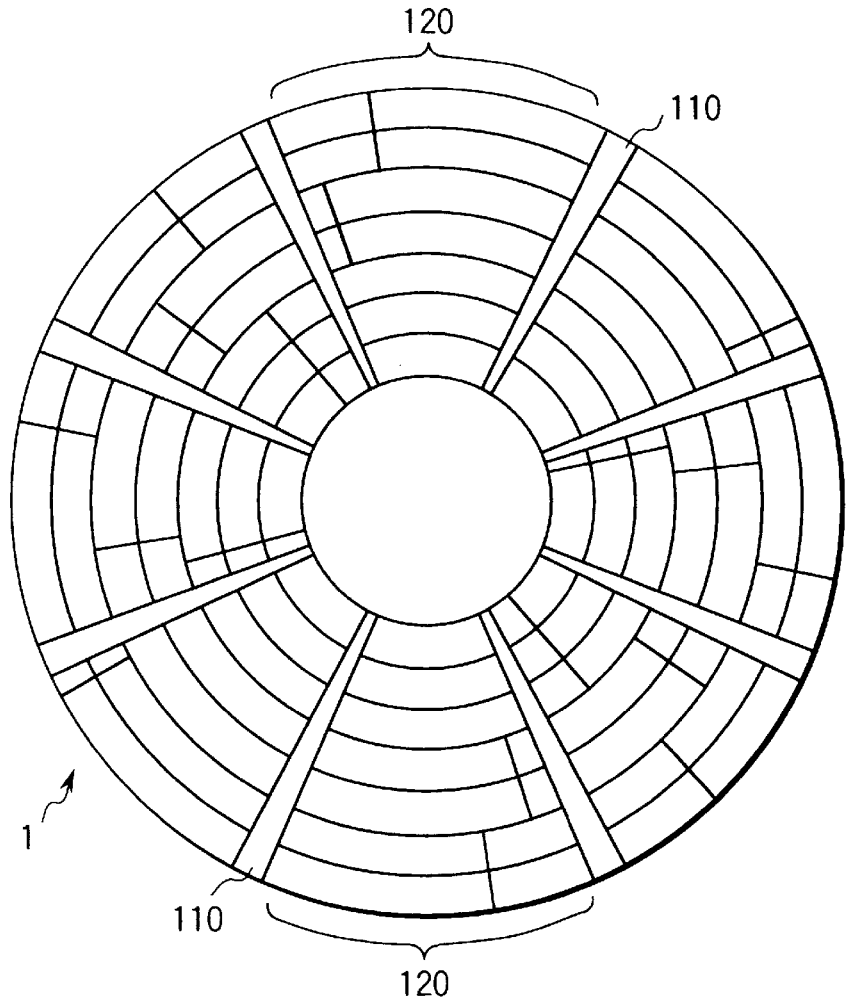
FIG. 2 is a schematic view showing a typical example of a format of a disk 1 for use in the embodiment.

A multiplicity of concentric tracks are formed on the two sides of the disk 1, as shown in FIG. 2, each track having a plurality of servo regions 110 on each of which servo data for use to, for example, control position is recorded and which are formed at the same intervals.

Servo data above contains a cylinder code indicating the cylinder number and burst data for indicating an error in the position of the cylinder indicated with the cylinder code, the error in the position being indicated with the amplitude of a waveform.

The servo regions 110 are formed radially from the center of the disk 1 to traverse the tracks. Areas between the servo regions 110 are formed into user regions (data regions) 120. A plurality of data sectors are formed in each of the user regions 120.

Figure 3:
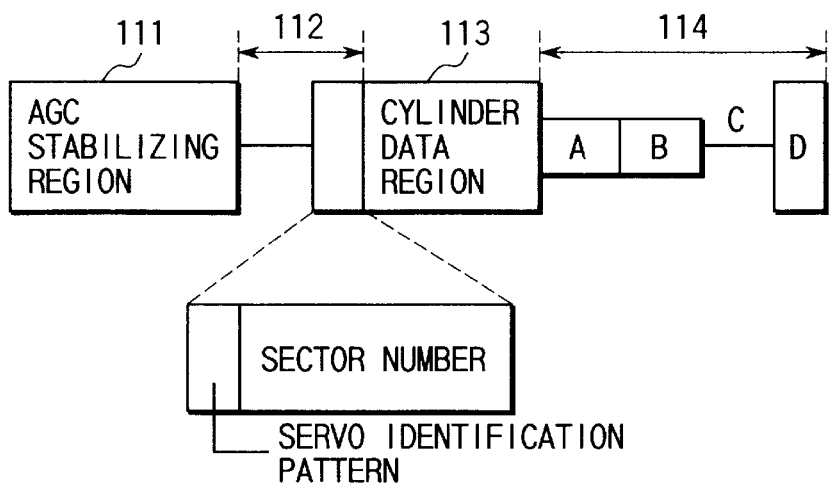
FIG. 3 is a schematic view showing an example of a format of the servo region shown in FIG. 2.

As shown in FIG. 3, the servo region 110 has known regions, such as a AGC stabilizing region (an amplitude AGC region) 111, a sector data region 112, a cylinder data region 113 and a burst region 114.

Data having a predetermined frequency and capable of stabilizing the amplitude of the signal has been recorded on the AGC stabilizing region (amplitude AGC region) 111.

Sector data indicating a peculiar servo identification pattern for identifying erasing and servo regions and the sector number (the servo sector number) is recorded on the sector data region 112.

Cylinder data (a cylinder code) indicating the cylinder number is recorded on the cylinder data region 113.

Burst data for indicating, with the amplitude of a waveform, the position error in the cylinder indicated with cylinder data is recorded on the burst region 114.

Burst data, which is recorded on the burst region 114, is composed of, for example, four burst signals (position error signals) A, B, C and D. A combination (a first burst pair) of burst signals A and B and another combination (a second burst pair) of burst signals C and D are selectively used to control positioning of the head 2. The width for which each of the burst signals A, B, C and D is recorded coincides with the pitch of the tracks.

The disk 1 is rotated at high speed by a spindle motor (SPM) 3. The head 2 is attached to a head moving mechanism called a carriage 4. When the carriage 4 is moved, the head 2 is moved in the radial direction of the disk 1. The carriage 4 is moved by a voice coil motor (VCM) 5.

The voice coil motor (VCM) 5 is connected to a VCM driver 6 for rotating the voice coil motor 5 by supplying a control current to the voice coil motor 5.

Note that a SPM driver for rotating the spindle motor (SPM) 3 by supplying a control current to the spindle motor 3 is omitted from illustration.

The value of the control current (the controlled variable) required to rotate the voice coil motor 5 is determined in accordance with a result of a calculation performed by the CPU (a microprocessor) 12 so as to be supplied to a D/A (digital/analog) conversion circuit 7 in the form of a digital value.

The D/A conversion circuit 7 converts the controlled variable in the form of a digital value and supplied from the CPU 12 into an analog controlled variable to output the obtained controlled variable to the VCM driver 6. Also the control current required to rotate the spindle motor 3 is processed similarly.

Each head 2 is connected to a head amplifier circuit 8 mounted on, for example, a flexible printed circuit board (FPC). The head amplifier circuit 8 switches the head 2 and inputs/outputs a reading/writing signal to and from the head 2. The head amplifier circuit 8 has a head amplifier (a preamp) (not shown) for amplifying an analog output read by the head 2 and a writing driver (not shown) for outputting a writing signal (a writing current) to the head 2 in accordance with writing data supplied from a reading/writing circuit 9 to be described later.

The reading/writing circuit 9 has a reading channel 91 which receives an analog output (a read signal obtained by the head 2) read from the disk 1 by the head 2 and amplified by a head amplifier circuit 8 (a head amplifier in the head amplifier circuit 8) to perform a process for reproducing data; a peak detection circuit 92 for detecting the peak of the analog output to binary-coding the peak; a sample holding circuit 93 for extracting, from the analog output, burst data included in servo data required to perform a servo process, such as the control of positioning of the head; and writing channel (not shown) for performing a signal process required to record data on the disk 1.

A servo data detection circuit 10 is connected to the reading/writing circuit 9. The servo data detection circuit 10 has a function of detecting the servo identification pattern in the sector data region 112 shown in FIG. 3 from the output from the peak detection circuit 92 in the reading/writing circuit 9 to detect the servo region 110 so as to output, to the sample holding circuit 93 in the reading/writing circuit 9, a burst switch signal 101 indicating timing of each of the burst signals A to D recorded on the burst region 114 in the servo regions 110.

Moreover, the servo data detection circuit 10 has a function of extracting/decoding cylinder data recorded on the cylinder data region 113 in the servo regions 110 to output data to the CPU 12. The servo data detection circuit 10 comprises, for example, a gate array (GA).

The sample holding circuit 93 in the reading/writing circuit 9 is connected to the A/D conversion circuit 11. The A/D (analog/digital) conversion circuit 11 A/D-converts burst data (the burst signals A to D) extracted (sample-held) by the sample holding circuit 93 to output digital data to the CPU 12.

The CPU 12 is a microprocessor in the form of, for example, one chip. The CPU 12 controls the sections in the magnetic disk apparatus in accordance with a control program stored in a ROM 13.

That is, the CPU 12 performs seeking and positioning control by controlling rotation of the voice coil motor 5 through the D/A conversion circuit 7 and the VCM driver 6 in accordance with cylinder data in the servo data extracted and decoded by the servo data detection circuit 10 and burst data in servo data extracted by the sample holding circuit 93 in the reading/writing circuit 9 so that the head 2 is moved to a desired position. Moreover, the CPU 12 performs control, for example, control of transference of reading/writing data by controlling the HDC 16.

A ROM (Read Only Memory) 13 in which a control program and the like for totally controlling the magnetic disk apparatus including the program for controlling the seeking and positioning of the head 2 has been stored, a RAM (Random Access Memory) 14 serving as, for example, a work region for the CPU 12 and an EEPROM (Electrically Erasable and Programmable Read Only Memory) 15 which is a rewriting-permitting nonvolatile memory for use to, for example, save parameters for controlling the magnetic disk apparatus are connected to the CPU 12. Reference value S, to be described later, for determining abnormality of the head and serving as a criterion for detecting a fault of the head 2 is registered in a predetermined region (a region in which a reference value is registered) 151 of the EEPROM 15.

Moreover, a disk controller (HDC) 16 is connected to the CPU 12. The HDC 16 controls communication of commands and data to and from a host apparatus (not shown) and also controls communication of data to and from the disk 1 through the reading/writing circuit 9.

The operation of the magnetic disk apparatus having the structure shown in FIG. 1 will now be described, the operation being a diagnosis process for early detecting a fault (a fault caused from breakage of the MR film) of the head 2 by using the pair of the burst signals A and B and the pair of the burst signals C and D.

Initially, the reason why a fault of the head 2 can be detected by using the pair of the burst signals A and B and the pair of the burst signals C and D will now be described with reference to FIGS. 4 to 6.

Figure 4:
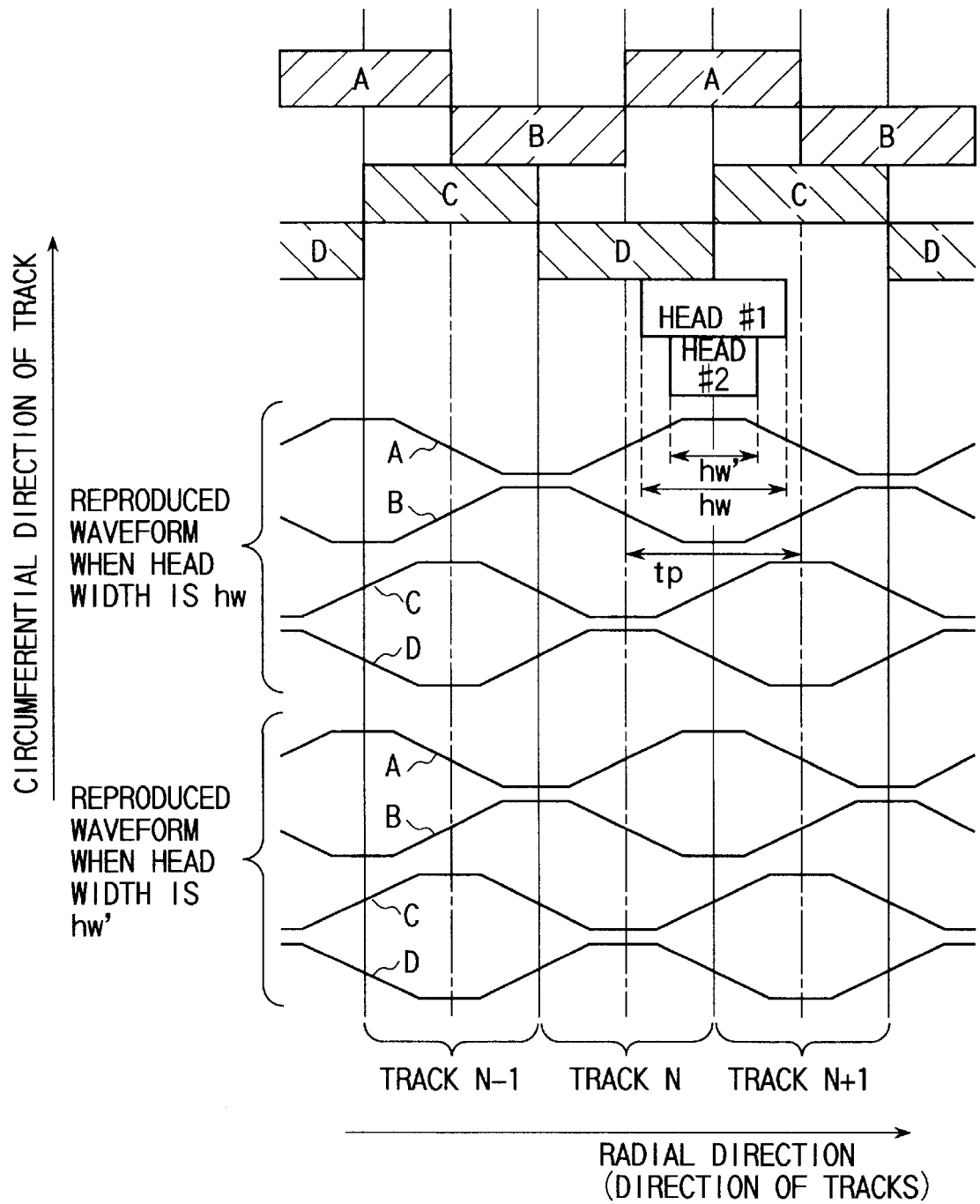
FIG. 4 shows positions at which burst signals A to D according to the present invention are recorded on a track and characteristics of the amplitude of a waveform reproduced by the head 2 with respect to the position on the track in a case where the width of the head (the width of the reproducing head) is hw in a normal state and in a case where the width of the head is hw' (hw'<hw) in an abnormal state.

FIG. 4 shows the relationship of the positions at which the burst signals A, B, C and D are recorded on the disk 1 and the positions of tracks (tracks N−1, N and N+1 are illustrated here) when the axis of abscissa stands for the direction of the track (the radial direction) of the disk 1 and the axis of ordinate stands for the circumference of the track.

Moreover, FIG. 4 has the axis of abscissa standing for the direction of the track of the disk 1 and the axis of ordinate standing for the amplitudes of the reproduced waveforms of (the reproducing head of) the head 2 in a case where the width of the head (the width of the reproducing head) of (the reproducing head of) the head 2 is hw, which is the usual width, and in a case where the width of the head is hw' (hw'<hw) which has been reduced because the MR film has been broken in a state where the head 2 is positioned at the boundary between the track N and the track N+1.

As can be understood from FIG. 4, when the width of the head 2 is reduced, the range in which each of the burst signals A to D is linearly changed is reduced.

The CPU 12 controls the position of the head 2 in such a manner that the position of the head 2 is detected in accordance with either the amplitudes of the burst signals A and B or the amplitudes of the burst signals C and D, as shown in FIG. 4.

A method of detecting the position of the head 2 will now be described with reference to FIG. 5. FIG. 5 has the axis of abscissa standing for the direction of the track of the disk 1 similarly to FIG. 4 and the axis of ordinate stands for the reproduction amplitudes of the burst signals A to D shown in FIG. 4 and $(A-B)/(A+B)$ and $(C-D)/(C+D)$ obtained from the burst signals A to D in the cases where the widths (the widths of the reproducing head) of the head 2 respectively are hw and hw'.

The reason why the normalization as $(A-B)/(A+B)$ and $(C-D)/(C+D)$ is performed is that the result of the detection does not depend on the value of the amplitude of the reproduction signal obtained by the head 2.

Figure 5:
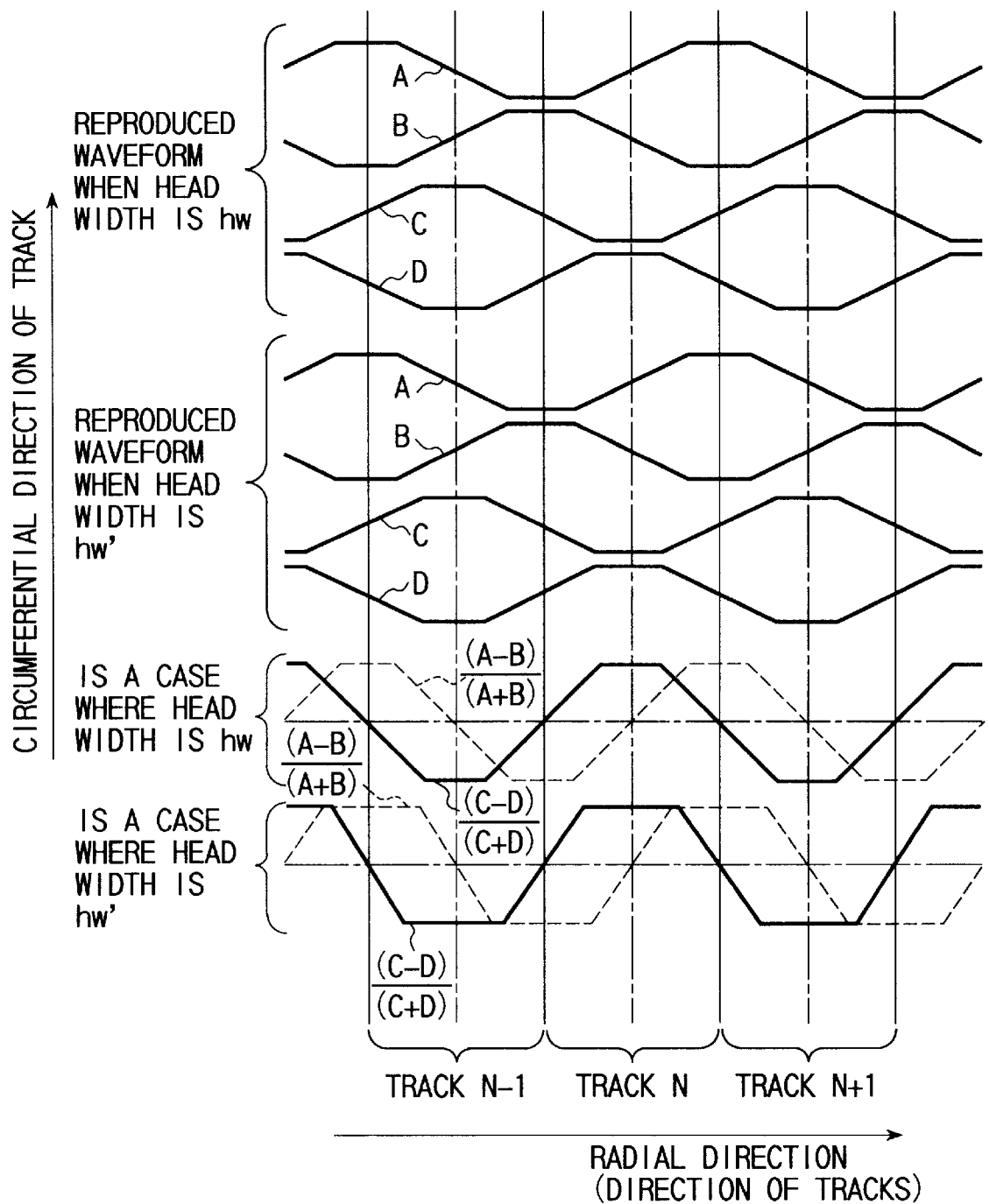
FIG. 5 shows reproduced amplitudes of the burst signals A to D shown in FIG. 4 and the characteristics of (A–B)/(A+B) and (C–D)/(C+D) calculated from the burst signals A to D with respect to the position of the track.

As can be understood from FIG. 5, if the width of the reproducing head is constant, the relationship between the position of the head 2 and the results of the calculations $(A-B)/(A+B)$ and $(C-D)/(C+D)$ is not changed regardless of the reproduction amplitude of the burst signal.

If the widths of the reproducing head are different as hw and hw', the relationship between the position of the head 2 and the results of the calculations is changed. If the MR film forming the reproducing head of the head 2 is broken, the width of the reproducing head is reduced.

Therefore, even if the result of the calculation $(A-B)/(A+B)$ or $(C-D)/(C+D)$ is the same, the position of the head 2 is therefore changed, as can be understood from the example shown in FIG. 5. Therefore, a correct position of the head 2 cannot easily be calculated to position the same from the result of the calculation $(A-B)/(A+B)$ or $(C-D)/(C+D)$.

That is, if the width of the head 2 (the width of the reproducing head) is changed owning to a partial breakage of the MR film, the value of $(A-B)/(A+B)$ and that of $(C-D)/(C+D)$ with respect to the position of the head 2 are changed.

The foregoing fact gives suggestions that measurement of changes in the values of the $(A-B)/(A+B)$ and $(C-D)/(C+D)$ with respect to the position of the head 2 enables the change in the width of the head 2 to be measured.

Figure 6:
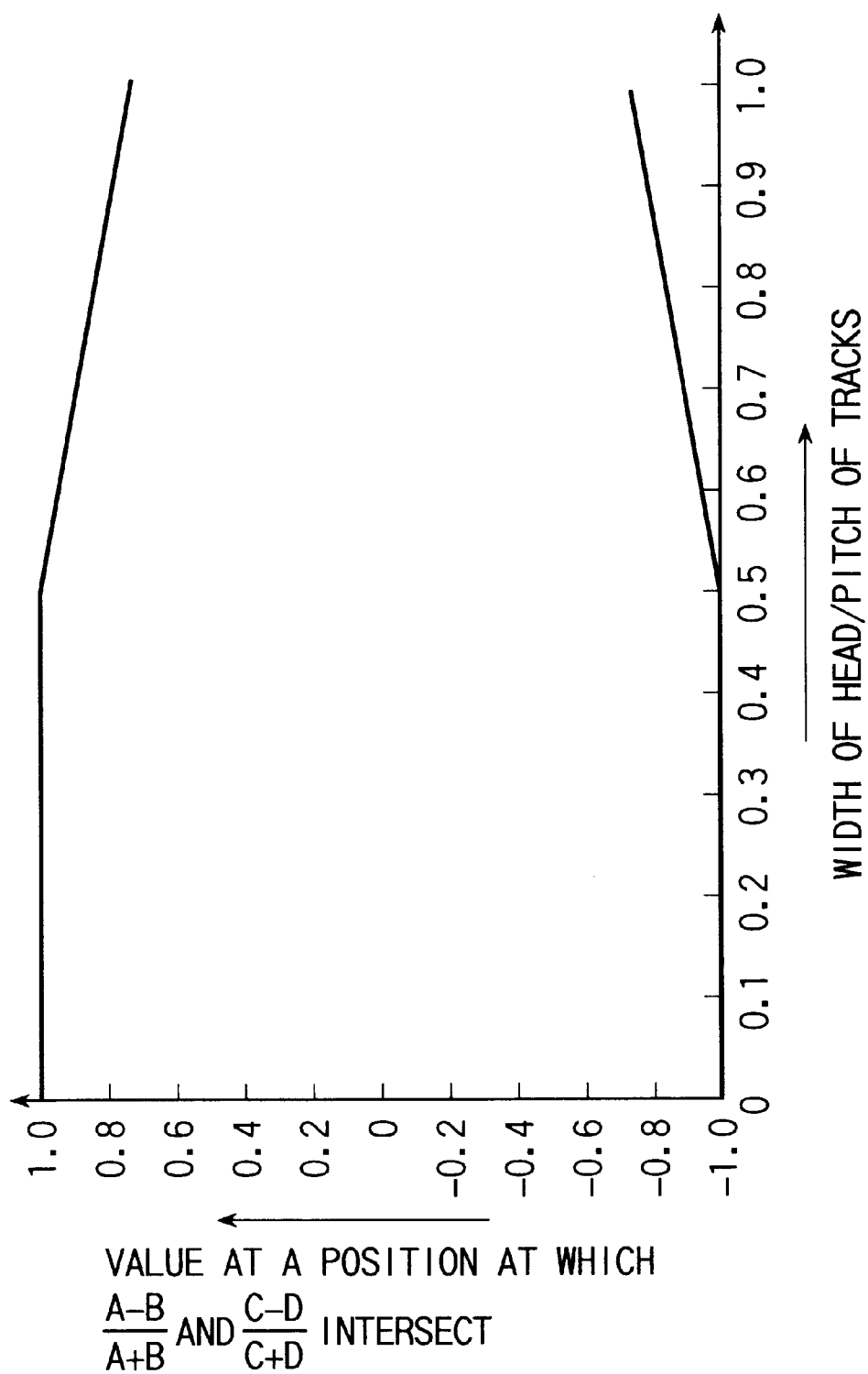
FIG. 6 is a diagram showing a fact that a value at which (A–B)/(A+B) and (C–D)/(C+D) intersect relates to the width of the head (the width of the track/the pitch of the tracks) normalized with the pitch of the tracks.

For example, the relationship between the width of the head 2 (the width of the track/the pitch of the track) and a value (at the position of the track) at which $(A-B)/(A+B)$ and $(C-D)/(C+D)$ intersect is as shown in FIG. 6.

As can be understood from the relationship shown in FIG. 6, the absolute value of the $(A-B)/(A+B)$ and $(C-D)/(C+D)$ when the $(A-B)/(A+B)$ and $(C-D)/(C+D)$ have the same value satisfies a linear relationship with respect to the width of the head 2 if the width of the head 2 with respect to the pitch of the track is not smaller than a predetermined value.

Therefore, the value at which the (A−B)/(A+B) and (C−D)/(C+D) intersect in a state where the head 2 is in a normal state is measured; the absolute value of the value at the intersection is stored as the reference value (the criterion for diagnosing the abnormality of the head 2) S; and the value at which the (A−B)/(A+B) and (C−D)/(C+D) intersect is arbitrarily measured to subject the absolute value of the measured value at the intersection to a comparison with the reference value S. Thus, the change in the width of the head 2 is detected so that the fault of the head 2 is detected.

Therefore, this embodiment has a structure such that the value at which the (A−B)/(A+B) and (C−D)/(C+D) intersect when the magnetic disk apparatus shown in FIG. 1 is, for example, manufactured. The absolute value of the measured value is registered in the EEPROM 15 as the reference value S for determining abnormality of the head.

Figure 7:
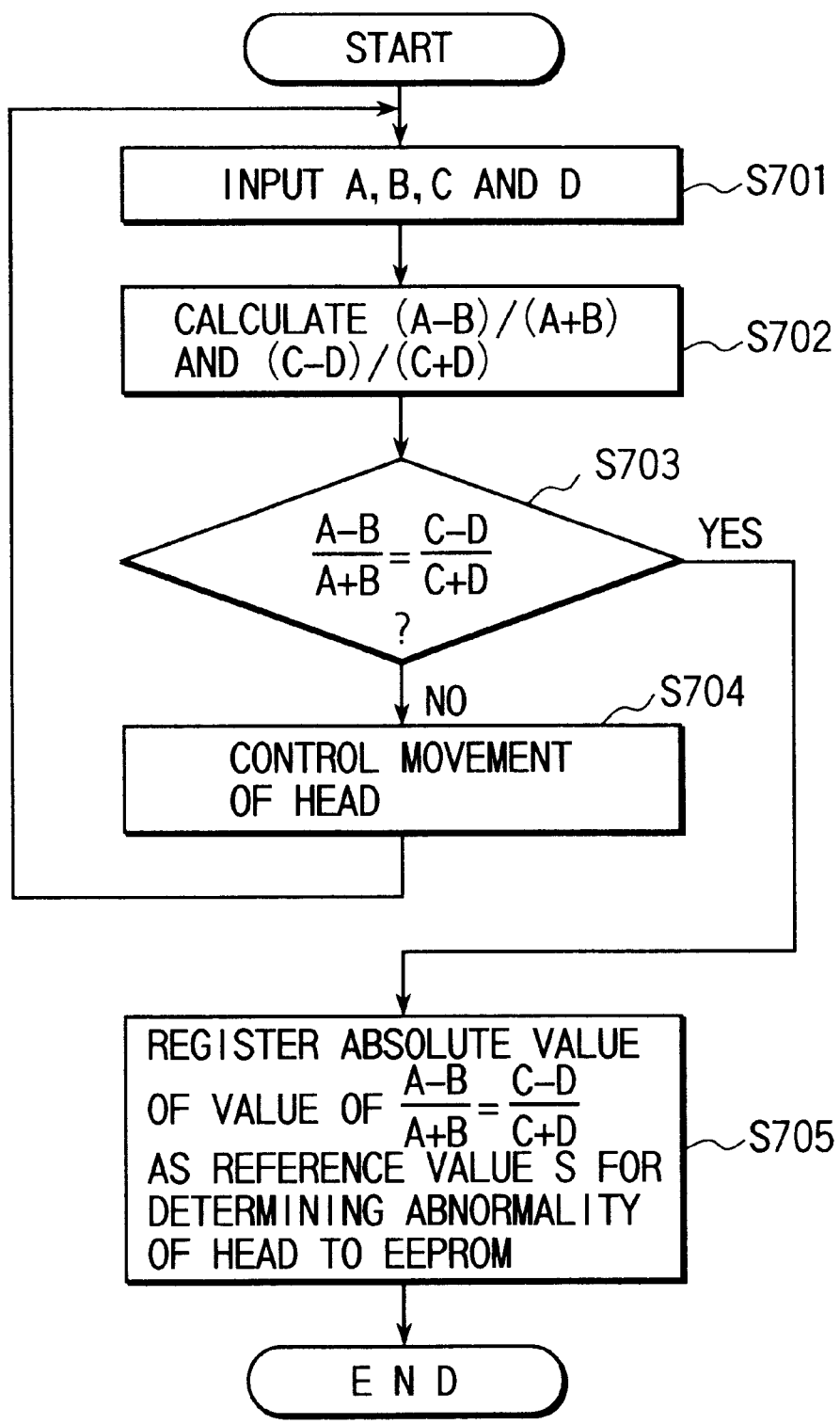
FIG. 7 is a flow chart showing an operation for registering a reference value for determining abnormality of a head according to the embodiment.

The operation for registering the reference value will now be described with reference to a flow chart shown in FIG. 7.

To register the reference value for determining abnormality of a head, the CPU 12 performs position control for positioning the head 2 at a position at which the (A−B)/(A+B) and (C−D)/(C+D) intersect, that is, the value of (A−B)/(A+B) and the value of (C−D)/(C+D) coincide with each other.

When the seeking and positioning control is performed, information recorded on the disk 1 is read by the head 2. An output (an analog output) representing information read by the head 2 is amplified by the (head amplifier) in the head amplifier circuit 8, and then supplied to the reading/writing circuit 9.

The peak detection circuit 92 in the reading/writing circuit 9 binary-codes the read signal amplified by the head amplifier circuit 8 and supplied from the head 2 by detecting the peak of the pulses so as to extract the data pulses. The servo data detection circuit 10 detects, from the data pulses extracted by the peak detection circuit 92, a servo identification pattern in the sector data region 112 shown in FIG. 3. In accordance with the detection timing, the servo data detection circuit 10 outputs, to the sample holding circuit 93 in the reading/writing circuit 9, the burst switch signal 101 indicating the timing of each of the burst signals A, B, C and D recorded on the burst region 114.

At the timing of the burst switch signal 101 supplied from the servo data detection circuit 10, the sample holding circuit 93 performs an operation for sample-holding the read signal amplified by the head amplifier circuit 8 and supplied from the head 2 so as to extract the burst signals A, B, C and D. The burst signals A, B, C and D are A/D-converted by the A/D conversion circuit 11 so as to be supplied to the CPU 12.

The CPU 12 receives the burst signals (burst data items) A, B, C and D extracted by the sample holding circuit 93 and A/D-converted by the A/D conversion circuit 11 (step 701) to calculate the value of (A−B)/(A+B) and that of (C−D)/(C+D) (step 702).

Then, the CPU 12 determines whether or not the value of (A−B)/(A+B) and that of (C−D)/(C+D) are the same (step 703). If the two values are not the same, the CPU 12 controls the operation of the voice coil motor 5 through the D/A conversion circuit 7 and the VCM driver 6 in order to move the head 2 in a direction in which the two values are made to be the same (step 704).

The CPU 12 repeats steps 701 to 704. When the value of (A−B)/(A+B) and that of (C−D)/(C+D) have been made to be the same, that is, when the head 2 has been positioned to the position at which the value of (A−B)/(A+B) and that of (C−D)/(C+D) are the same, the CPU 12 registers the absolute value of the above-mentioned value to the predetermined region 151 of the EEPROM 15 as the reference value S for determining abnormality of the head (step 705).

Figure 8:
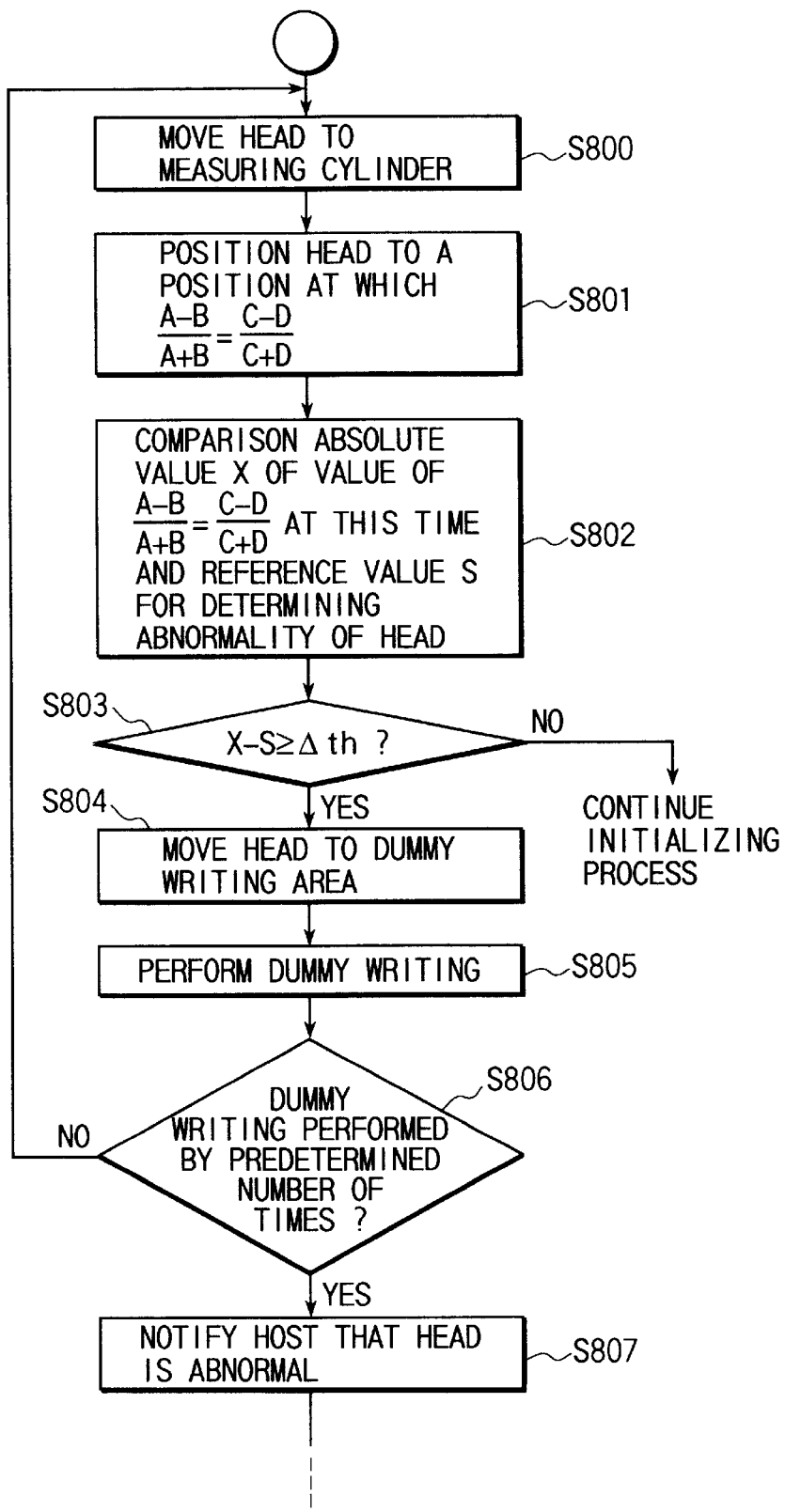
FIG. 8 is a flow chart of an operation for detecting abnormality of the head according to the embodiment which is performed during an initialization process.

An operation for detecting abnormality of a head during use by a user by using the reference value S for determining abnormality of a head registered in the EEPROM 15 when the magnetic disk apparatus has been manufactured will now be described with reference to a flow chart shown in FIG. 8.

After electric power has been supplied to the apparatus, the CPU 12 performs initialization in accordance with an initialization routine included in the control program stored in the ROM 13. During the initialization process, the CPU 12 performs first seek for seeking the head 2 to a measuring cylinder on the disk 1 (step 800), and then performs the operation for detecting abnormality of a head in accordance with the flow chart shown in FIG. 8 as follows.

Initially, the CPU 12 positions the head 2 to a position at which (A−B)/(A+B)=(C−D)/(C+D) (step 801). The positioning operation in step 801 is realized by repeating steps 701 to 704 shown in FIG. 7 until (A−B)/(A+B)=(C−D)/(C+D).

When the CPU 12 has positioned the head 2 to the position at which (A−B)/(A+B)=(C−D)/(C+D), the CPU 12 subjects absolute value X of the value (A−B)/(A+B)=(C−D)/(C+D) at this time and the reference value S for determining abnormality of a head registered in the predetermined region 151 of the EEPROM 15 to a comparison (step 802) to determine whether or not the value X−S is larger than a predetermined threshold value Δth (step 803).

If the value X−S is determined to be larger than the predetermined threshold value Δth in step 803, the CPU 12 performs a dummy writing operation to overcome the abnormality state of the MR film of the head 2.

The dummy writing operation is an operation using a dummy writing track previously formed on the disk 1 to position the head 2 to the dummy writing track (step 804), followed by supplying a writing current to the writing head to generate a recording magnetic field (step 805). Usually, plural (for example, 5 times) dummy writing operations are performed.

If the abnormality state of the MR film is caused from appearance of BHN, there is a possibility that the BHN disappears by causing a magnetic field to act on the MR film of the reading head. That is, the dummy writing operation is performed to cause a magnetic field to act to return the state of the magnetic domains of the upper shield and the MR film for forming the MR head to a stable state so that BHN disappears.

To cause the magnetic field to greatly affect the MR head, it is preferable that the writing current for use in the dummy writing operation be larger than the writing current for use in a usual writing operation.

Moreover, it is preferable that the sensing current for the MR head be changed when the dummy writing operation is performed to enhance the stabilization of the magnetic domain structure of the MR film. The sensing current is sectioned to flow in SAL film, a spacer and the MR film of the MR head so that a rotating field conforming to the Ampere's corkscrew rule is generated around each film.

Therefore, change of the sensing current results in the rotating field being changed proportionally to the change. Thus, the magnetic domain structure can be affected. Thus, change of the sensing current together with the dummy writing operation the magnetic domain structure of the MR film is considerably affected only when the dummy writing operation is performed. As a result, stabilization of the magnetic domain structure can be enhanced.

Specifically, if BHN appears in a case where range Is1 of the sensing current for the MR head is 5 mA (DC) to 7 mA (DC), BHN affects in a case where the sensing current IS0 is determined to be 6 mA (DC) for the HDD.

Therefore, if the range Is2 of the sensing current is changed from 8 mA (DC) to 10 mA (DC) when the dummy writing operation is performed, there is a possibility that BHN disappears.

Then, whether or not the dummy writing operations have been performed by the predetermined number of times is determined (S806). If a determination is performed in step 806 that the dummy writing operations have not been performed by the predetermined number of times, the operation returns to step 800.

If a determination is performed in step 806 that the dummy writing operations have been performed by the predetermined number of times, a determination is performed that a portion of the MR film (of the reproducing head) of the head 2 has been broken and thus the width of the head 2 (the width of the reproducing head) has been reduced. Thus, the abnormality of the head (that is, a fault of the head) is communicated to the host apparatus through the HDC 16 (step 807).

If a determination is performed in step 803 that the value of X−S is smaller than the threshold value Δth, the CPU 12 determines that the head 2 is normal and continues the initializing process.

Although the above-mentioned description has been performed about a structure in which burst data to be provided for the burst region 114 in the servo regions 110 is composed of two pairs consisting of the pair of the burst signals A and B and the pair of the burst signals C and D, the present invention is not limited to this.

Figure 9:
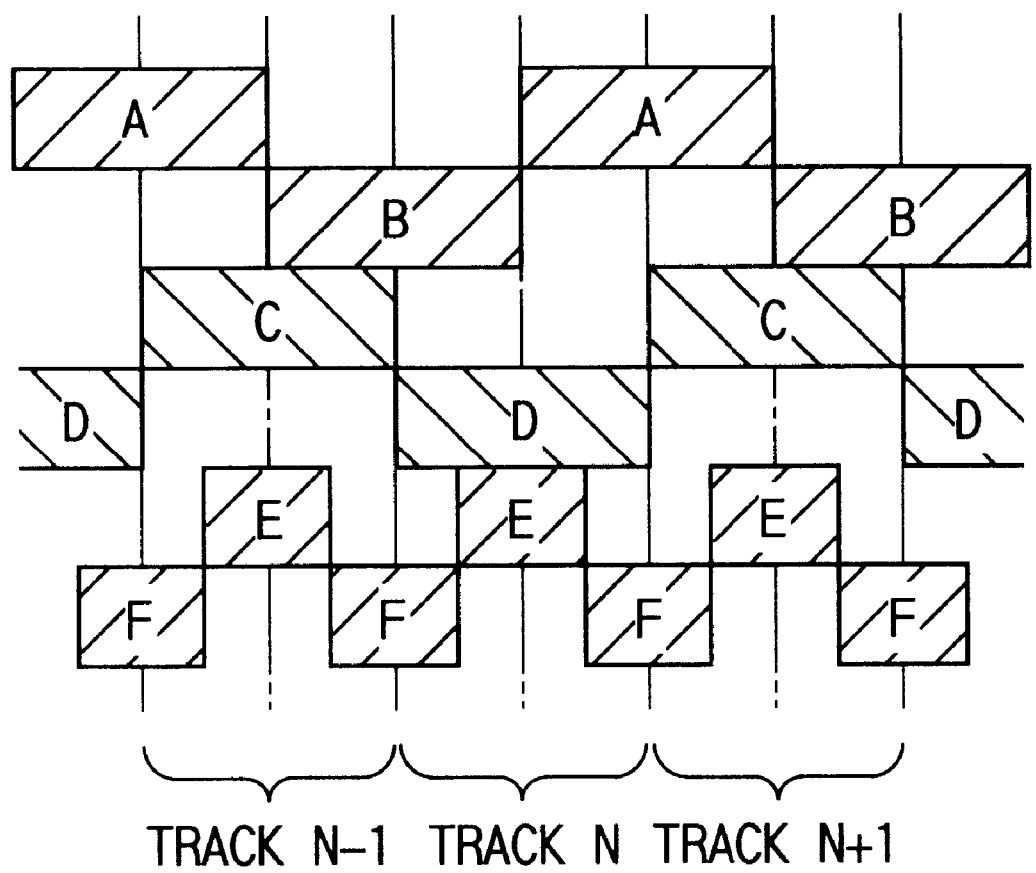
FIG. 9 is a schematic view showing an example of a format of burst data composed of three burst pairs.

The present invention is applied to a magnetic disk apparatus in which the control for positioning the head 2 is performed by using burst data in the burst region 114 of the servo regions 110, as shown in FIG. 9, having a pair of burst signals E and F (which are alternately recorded to have a width which is ½ of the pitch of the tracks with respect to a position deviated from the center of each track by ±¼ track) in addition to the pair of the burst signals A and B (which are alternately recorded to have a width which is the same as the pitch of the tracks with respect to the center of each track) and the pair of the burst signals C and D (which are alternately recorded to have a width which is the same as the pitch of the tracks with respect to the boundary between tracks).

Specifically, the present invention may be applied to a magnetic disk apparatus arranged in such a manner that one of the three pairs of the burst signals forming burst data is selectively used to detect the position of the head 2 in accordance with a value of (I−j)/(i+j) calculated from amplitudes i and j of the two burst signals (assuming that the burst signals are burst signals i and j) forming the selected pair so that positioning of the head 2 is controlled in accordance with a result of the position detection.

When results of calculations (i−j)/(i+j) of two arbitrary pairs of the three pairs of the burst signals coincide with each other, absolute value S of the value is registered as reference value S for determining abnormality of a head in (the predetermined region 151 in) the EEPROM 15 when the apparatus is manufactured.

When a user operates the apparatus, the head 2 is positioned to the position at which the results of calculations (i−j)/(i+j) of the two arbitrary pairs of the three pairs of the burst signals coincide with each other. Absolute value X of the value is subjected to a comparison with the reference value S for determining abnormality of a head registered (in the predetermined region 151) into the EEPROM 15. If the difference X−S is larger than Δth, a determination is performed that the head 2 is abnormal.

Since the above-mentioned embodiment is structured in such a manner that the process for detecting abnormality of the head is performed during the initializing process which is performed when electric power is supplied to the magnetic disk apparatus, the operation which is performed by a user to read/write data is not delayed by the process for detecting abnormality of the head.

The process for detecting abnormality of the head may be periodically performed during use by the user.

Since the process for detecting abnormality of the head is performed as described above, the operation which is performed by the user to read/write data is sometimes somewhat delayed. However, abnormality of the head can early and reliably be detected.

As described above, the present invention is structured in such a manner that attention is paid to a fact that the characteristic of the reproduction output of the burst pair for use to control positioning is changed if the width of the head is reduced attributable to a partial breakage or the like of the head; and change in the characteristic is used to detect a fault of the head during use by a user. Therefore, the fault of the head can early be detected before the head is critically broken.

In a case where the fault of the MR film is caused from appearance of BHN, execution of the dummy writing operation enables BHN to be eliminated so as to make the MR film to be normal state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A magnetic disk apparatus comprising:

detection means for detecting first to fourth burst signals corresponding to first to fourth burst data items recorded on a recording medium in order to position a head;

calculating means for calculating a first value expressed by ((the first burst signal)−(the second burst signal))/((the first burst signal)+(the second burst signal)) and a second value expressed by ((the third burst signal)−(the fourth burst signal))/((the third burst signal)+(the fourth burst signal)) from amplitudes of the first to fourth burst signals detected by said detection means;

control means for moving said head to a position at which the first value and the second value obtained by said calculating means coincide with each other;

storage means for storing a reference value with which abnormality of said head is determined;

first determination means for determining whether or not difference between an absolute value of the first value and the reference value stored in said storage means when said head has been moved to the position at which the first value and the second value coincide with each other by said control means is larger than a predetermined value; and abnormality detection means for detecting abnormality of said head in a case where said first determination means has determined that a difference value between the absolute value of the first value and the reference value is larger than the predetermined value.

2. The magnetic disk apparatus according to claim 1, wherein said control means performs head moving process and said abnormality detection means performs abnormality detection process during an initialization process which is performed after electric power has been supplied to said magnetic disk apparatus.

3. The magnetic disk apparatus according to claim 1, wherein the reference value is stored in said storage means when said magnetic disk apparatus is manufactured.

4. The magnetic disk apparatus according to claim 1, wherein said storage means is an EEPROM.

5. The magnetic disk apparatus according to claim 1, wherein the reference value is the first value when said head has been moved by said control means to a position at which the first value and the second value coincide with each other when said magnetic disk apparatus has been manufactured.

6. The magnetic disk apparatus according to claim 1, wherein said abnormality detection means comprises:

dummy writing means for performing a dummy writing operation in a case where said first determination means has determined that the absolute value of the first value is larger than the reference value;

second determination means for determining whether or not said dummy writing means has performed the dummy writing operations by a predetermined number of times; and means for detecting abnormality of said head in a case where said second determination means has determined that the dummy writing operations have been performed by the predetermined number of times.

7. A magnetic disk apparatus structured to detect burst signals i and j corresponding to burst data i and j from a recording medium on which at least three burst data pairs each having burst data i and j have been recorded, to position a head thereof in accordance with detected burst signals i and j, said magnetic disk apparatus comprising:

calculating means for obtaining a result of a calculation expressed by $(i-j)/(i+j)$ for each pair from amplitudes of the burst signals i and j in two arbitrary pairs among the detected burst signals i and j;

control means for moving said head to a position at which results of calculations of the two arbitrary pairs obtained by said calculating means coincide with each other;

storage means for storing a reference value for determining abnormality of said head;

first determination means for determining whether or not difference between an absolute value of the result of the calculation when said head has been moved to the position at which the results of calculations of the two arbitrary pairs coincide with each other by said control means and the reference value stored in said storage means is larger than a predetermined value; and abnormality detection means for detecting abnormality of said head in a case where said first determination means has determined that the difference between the absolute value of the result of the calculation and the reference value is larger than the predetermined value.

8. The magnetic disk apparatus according to claim 7, wherein said control means performs head moving process and said abnormality detection means performs abnormality detection process during an initialization process which is performed after electric power has been supplied to said magnetic disk apparatus.

9. The magnetic disk apparatus according to claim 7, wherein the reference value is stored in said storage means when said magnetic disk apparatus is manufactured.

10. The magnetic disk apparatus according to claim 7, wherein said storage means is an EEPROM.

11. The magnetic disk apparatus according to claim 7, wherein the reference value is a result of a calculation when said head has been, by said control means, moved to the position at which the results of the calculations of the two arbitrary pairs coincide with each other when said magnetic disk apparatus has been manufactured.

12. The magnetic disk apparatus according to claim 7, wherein said abnormality detection means comprises:

dummy writing means for performing a dummy writing operation in a case where said first determination means has determined that the absolute value of the first value is larger than the reference value;

second determination means for determining whether or not said dummy writing means has performed the dummy writing operations by a predetermined number of times; and means for detecting abnormality of said head in a case where said second determination means has determined that the dummy writing operations have been performed by the predetermined number of times.

13. A method of detecting a fault of a head, comprising the steps of:

detecting first to fourth burst signals corresponding to first to fourth burst data items recorded on a recording medium in order to position a head;

calculating a first value expressed by ((the first burst signal)−(the second burst signal))/((the first burst signal)+(the second burst signal))

and a second value expressed by ((the third burst signal)−(the fourth burst signal))/((the third burst signal)+(the fourth burst signal)) from amplitudes of detected first to fourth burst signals;

moving said head to a position at which the first value and the second value coincide with each other;

determining whether or not the difference between an absolute value of the first value and the reference value when said head has been moved to the position at which the first value and the second value coincide with each other is larger than a predetermined value; and detecting abnormality of said head in a case where a determination has been performed that the difference between the absolute value of the first value and the reference value is larger than the predetermined value.

14. The method of detecting a fault of a head according to claim 13, wherein
the head moving process and the abnormality detection process are performed during an initialization process which is performed after electric power has been supplied to the magnetic disk apparatus.

15. The method of detecting a fault of a head according to claim 13, wherein
the reference value is the first value when said head has been moved to the position at which the first value and the second value coincide with each other when said magnetic disk apparatus has been manufactured.

16. The method of detecting a fault of a head according to claim 13, wherein
the step of detecting abnormality comprising the steps of:
performing a dummy writing operation in a case where a determination has been performed that the absolute value of the first value is larger than the reference value;
determining whether or not the dummy writing operations have been performed by a predetermined number of times; and
detecting abnormality of said head in a case where a determination has been performed that the dummy writing operations have been performed by the predetermined number of times.

17. A method of detecting a fault of a head comprising the steps of:
detecting burst signals i and j corresponding to burst data i and j from a recording medium on which at least three burst data pairs each having burst data i and j have been recorded;
obtaining a result of a calculation expressed by (i−j)/(i+j) for each pair from amplitudes of the burst signals i and j in two arbitrary pairs among the detected burst signals i and j;
moving said head to a position at which results of calculations of two arbitrary pairs coincide with each other;
determining whether or not difference between an absolute value of the result of the calculation when said head has been moved to the position at which the results of calculations of the two arbitrary pairs coincide with each other and a reference value is larger than a predetermined value; and
detecting abnormality of said head in a case where a determination has been performed that the difference between the absolute value of the result of the calculation and the reference value is larger than the predetermined value.

18. The method of detecting a fault of a head according to claim 17, wherein
the head moving process and the abnormality detection process are performed during an initialization process which is performed after electric power has been supplied to said magnetic disk apparatus.

19. The method of detecting a fault of a head according to claim 17, wherein
the reference value is the result of the calculation when said head has been moved to the position at which the results of calculations of the two arbitrary pairs coincide with each other when said magnetic disk apparatus has been manufactured.

20. The method of detecting a fault of a head according to claim 17, wherein
the step of detecting abnormality of said head comprising the steps of:
performing a dummy writing operation in a case where a determination has been performed that the absolute value of the first value is larger than the reference value;
determining whether or not the dummy writing operations have been performed by a predetermined number of times; and
detecting abnormality of said head in a case where a determination has been performed that the dummy writing operations have been performed by the predetermined number of times.

* * * * *